United States Patent [19]
Betts et al.

[11] Patent Number: 4,507,825
[45] Date of Patent: Apr. 2, 1985

[54] SELF-ADJUSTING TAIL BREAKER MEANS

[75] Inventors: Edmund D. Betts, Libertyville; Jon T. Keith, Wheeling, both of Ill.

[73] Assignee: Gregor Jonsson Associates, Inc., Highland Park, Ill.

[21] Appl. No.: 526,460

[22] Filed: Aug. 25, 1983

[51] Int. Cl.³ .............................................. A22C 29/02
[52] U.S. Cl. ......................................................... 17/73
[58] Field of Search .......................... 17/71, 72, 73, 48

[56] References Cited
U.S. PATENT DOCUMENTS
3,247,542  4/1966  Jonsson ..................................... 17/73

Primary Examiner—Willie G. Abercrombie
Attorney, Agent, or Firm—Marshall, O'Toole, Gerstein, Murray & Bicknell

[57] ABSTRACT

A tail breaker cam assembly for use with a shrimp processing machine for aiding in the fracturing of the tail of a shrimp from the main shrimp shell, the tail breaker cam assembly including a first, fixed cam member and a second cam member pivotal about the first cam member with a biasing means to urge the pivoting cam member to move in one direction and means for limiting the amount of travel of the pivotable second cam member.

16 Claims, 8 Drawing Figures

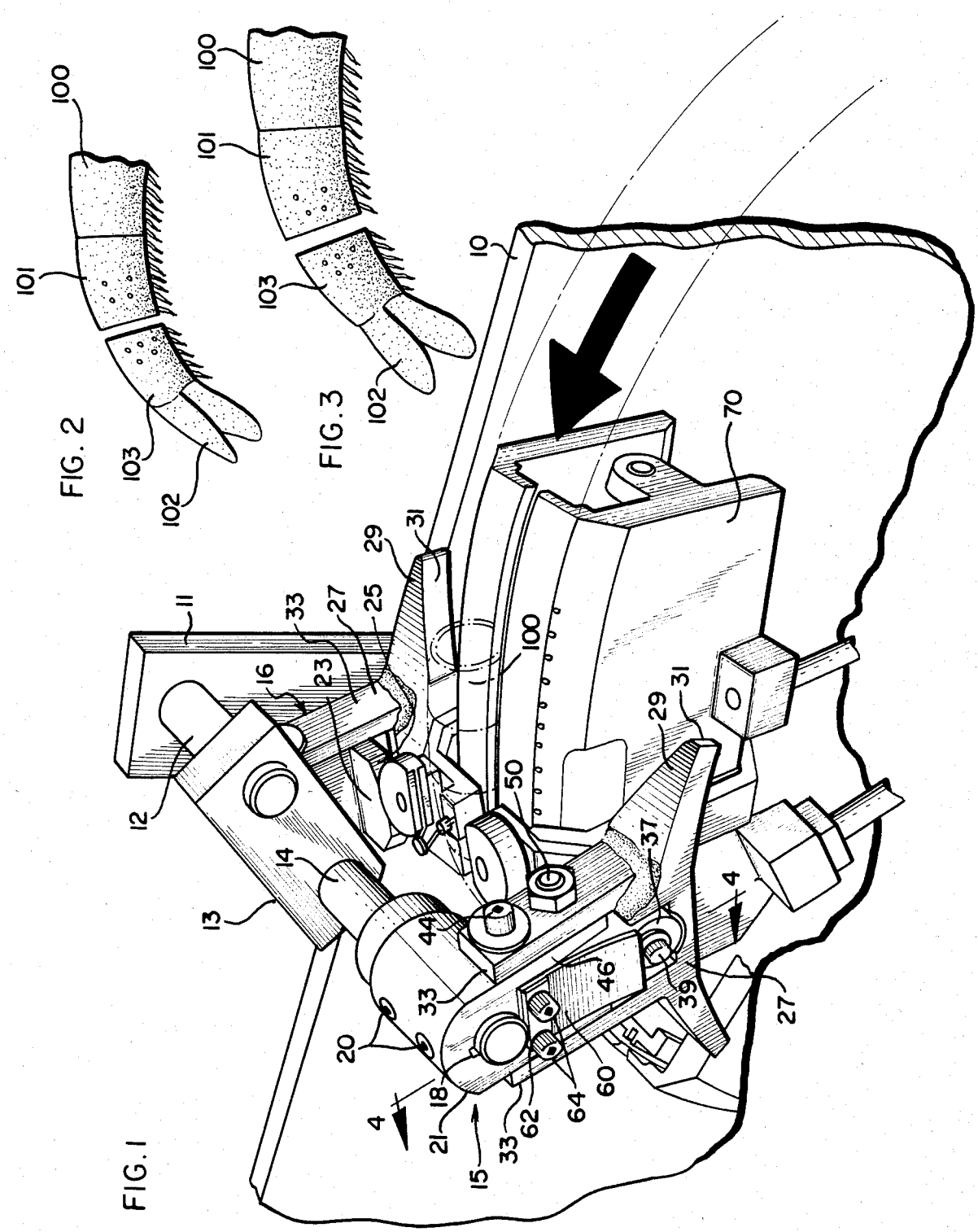

SELF-ADJUSTING TAIL BREAKER MEANS

The invention disclosed and claimed herein relates to a new and improved shrimp tail breaker assembly for fracturing the shell of a shrimp without tearing the meat and more particularly to an improved tail breaker assembly which automatically accommodates for different size shrimp being deposited in the tail breaker assembly.

BACKGROUND OF THE INVENTION

The present invention relates to the preparation of shrimp so as to leave the tail of the shrimp attached to the flesh body of the shrimp from which the shell is removed.

Cleaned shrimp consisting of flesh bodies of shrimp to which the shrimp tails remain attached and from which the sand veins and main portions of the shrimp shells have been removed have been referred to as cleaned "tail-on" shrimp.

The production of cleaned "tail-on" shrimp is complicated by the fact that the flesh bodies of raw shrimp have only very limited structural strength, the strength of each flesh body being weakest at the juncture of the shrimp tail with the flesh body. Moreover, this weak portion of the flesh body, which must be relied on to hold the tail attached to the flesh body, is vulnerable to being damaged as an incident to separation of the shrimp tail from the main portion of the shrimp shell in the production of "tail-on" shrimp. As a consequence, the tail of each shrimp is subject to being pulled loose from the flesh body of the shrimp, leaving the body tailless or with the tail so insecurely attached that the purpose of having "tail-on" shrimp is effectively diminished.

Machines have been designed to include shrimp tail breaker assemblies for separating the shrimp tail from the main shell of the shrimp without fracturing the shrimp flesh or meat. One method of breaking the shrimp tail to provide a tail-on shrimp is described in U.S. Pat. Nos. 3,247,542 and 3,277,517. The apparatus shown in these patents stretches the shell longitudinally with the shrimp tail being pulled relative to the stationary shrimp body shell. See, for example, U.S. Pat. No. 3,247,542, column 5, line 46 to column 6, line 61.

To carry out the shrimp tail breaking operation, tail breaker assemblies are employed to cause two pairs of clutch assemblies to contact the shrimp shell and tail section in a desired sequence determined by selected cam paths whereby the shrimp tail is fractured or separated from the shrimp shell without damaging or fracturing the shrimp flesh.

While shrimp cleaning machines having tail breaker assemblies have been found to be satisfactory for producing tail-on shrimp, several shortcomings exist with these machines. Initially, when shrimp of different size are processed through the machines, the tail breaker cam assemblies employed at the shrimp tail breaking station must be adjusted manually to accommodate various size shrimp. The reason for the adjustment is that both the shell and meat of shrimp are relatively fragile and, it has been found, they will be damaged or crushed excessively by the clutch assemblies in the event the tail breaker cam assemblies are not properly adjusted for various size shrimp. Unfortunately, it has been found that, in some instances, an operator will forget to make the necessary adjustment to accommodate a particular size shrimp or the adjustment will be made incorrectly whereby the shrimp is damaged or destroyed.

Another problem centers on the movement of the two pairs of clutch assemblies which contact the shrimp body and tail in a tail breaking operation. One pair of clutch assemblies is moved or pivoted a certain distance or "stroke" relative to the other pair of clutch assemblies whereby the shrimp tail is pulled relative to the stationary body shell to achieve the desired fracture or separation. This stroke is critical because too much stroke will over-stretch a small shrimp and damage it while too little stroke will not reliably separate the tail shell joint from the main shell on a large shrimp. Shrimp peeling machines presently available have employed manually adjustable tail breaker cams which serve as a compromise between the two stroke extremes whereby the stroke is constant and limited to a relatively small amount to avoid excessive damage to the shrimp.

What is desired is a shrimp peeling machine which includes a tail breaker means which permits a shrimp shell tail to be separated or fractured from the main body without fracturing the shrimp flesh with the tail breaker means automatically accommodating various size shrimp and delivering the particular stroke required for shrimp of different sizes.

SUMMARY OF THE INVENTION

The invention disclosed and claimed herein serves to minimize the problems or shortcomings found with conventional shrimp peeling machines having manually adjustable tail breaker cam assemblies and constant, limited stroke travel. Briefly, the improved tail breaker means of the present invention includes a tail breaker cam assembly which will automatically accommodate shrimp of different sizes.

The tail breaker cam assembly of the present invention includes an upper cam member and a lower cam member, the latter being biased for movement relative to the upper cam member whereby a biasing spring permits sufficient load to be applied to the lower cam so that a small shrimp can be firmly grasped by the clutches yet the biasing spring allows the lower cam to pivot outwardly to accommodate larger shrimp such that the shrimp shell and body will not be damaged.

Further, the provision of the biased lower cam member allows for the amount of stroke to be changed, i.e., a larger stroke automatically is provided for larger shrimp while a smaller stroke exists for smaller shrimp.

Accordingly, as will be explained in detailed description, the present invention serves to eliminate the need to adjust the tail breaker cams for different size shrimp; and, further the present invention provides for an automatic increase in stroke as the size of the shrimp increases.

These and other advantages will become more apparent from a further understanding of the drawings and detailed description.

DESCRIPTION OF DRAWINGS

FIG. 1 shows a fragmentary perspective view of the shrimp tail breaker assembly of the present invention with a shrimp shown in phantom disposed in a shrimp holder assembly;

FIG. 2 shows a fragmentary side view of the tail end of a small shrimp as it is carried in a shrimp holder and further illustrating the rupture of the shrimp shell by tension as effected in FIG. 7;

FIG. 3 shows a fragmentary side view of the tail end of a shrimp, which is larger in size than the shrimp illustrated in FIG. 2, as it is carried in a shrimp holder and further illustrating the rupture of the shrimp shell by tension as effected in FIG. 8;

DETAILED DESCRIPTION

Figure 4:
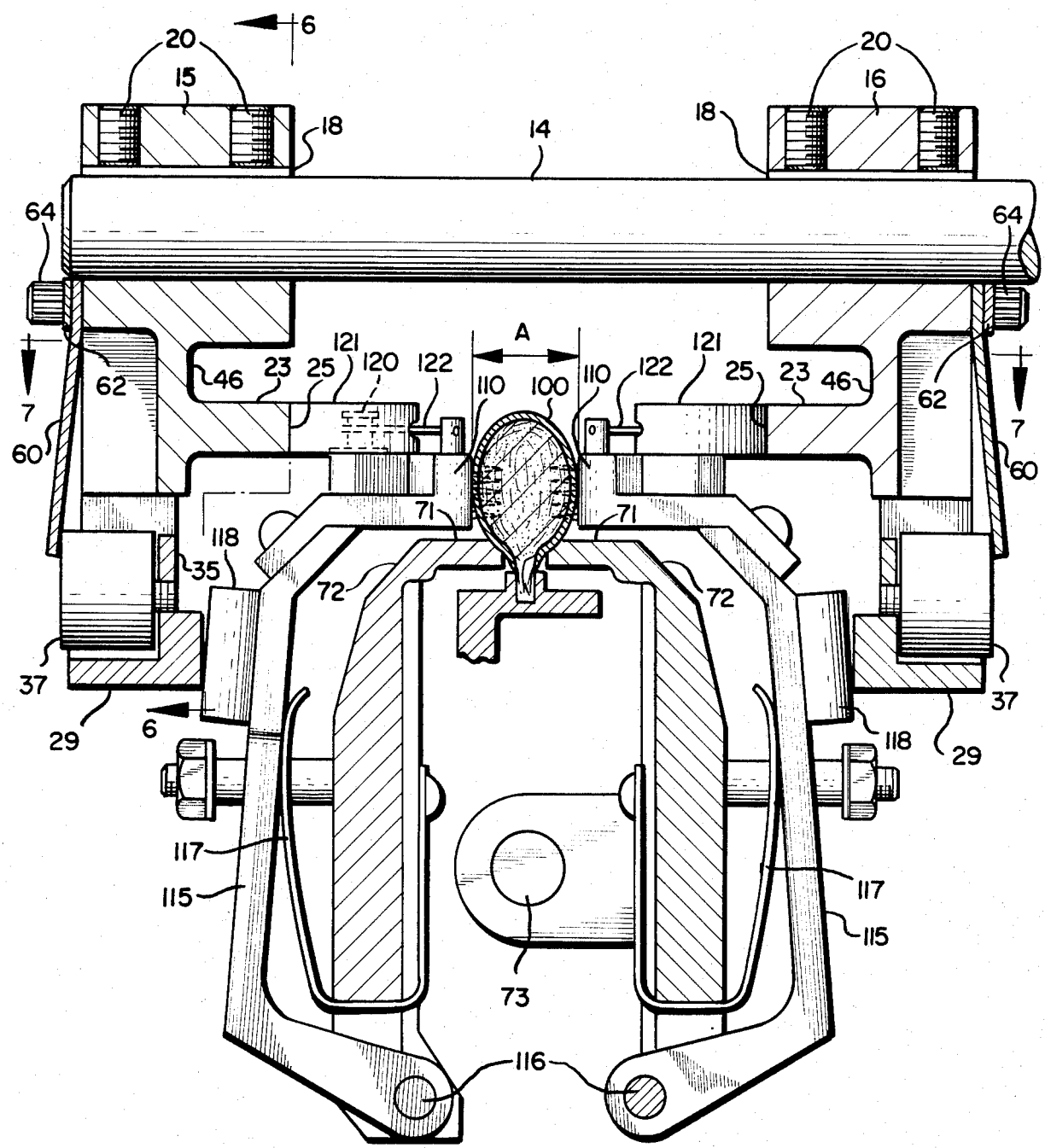
FIG. 4 shows a transverse section view of the shrimp holder taken along line 4—4 in FIG. 1 with the small shrimp shown in FIG. 2 disposed in the shrimp holder.

Referring to the drawings and more particularly FIG. 1, there is shown a portion of machine frame 10 upon which is disposed a tail breaker cam support member 11. A stud 12 is suitably connected to support 11 and a depending support block 13 is joined to the outer end of stud 12. A tail breaker cam support shaft 14 extends through support block 13, shown only in FIG. 1. Tail breaker cam assemblies 15, 16, one being identical to the other, are located at opposite ends of support shaft 14, each assembly being maintained in place by an appropriate key 18 and set screws 20.

Each of the tail breaker cam assemblies 15, 16 comprises an upper tail breaker cam member 21 mounted on support shaft 14 by keys 18 and set screws 20. Each upper cam member includes a cam 23 having a cam surface 25.

Figure 5:
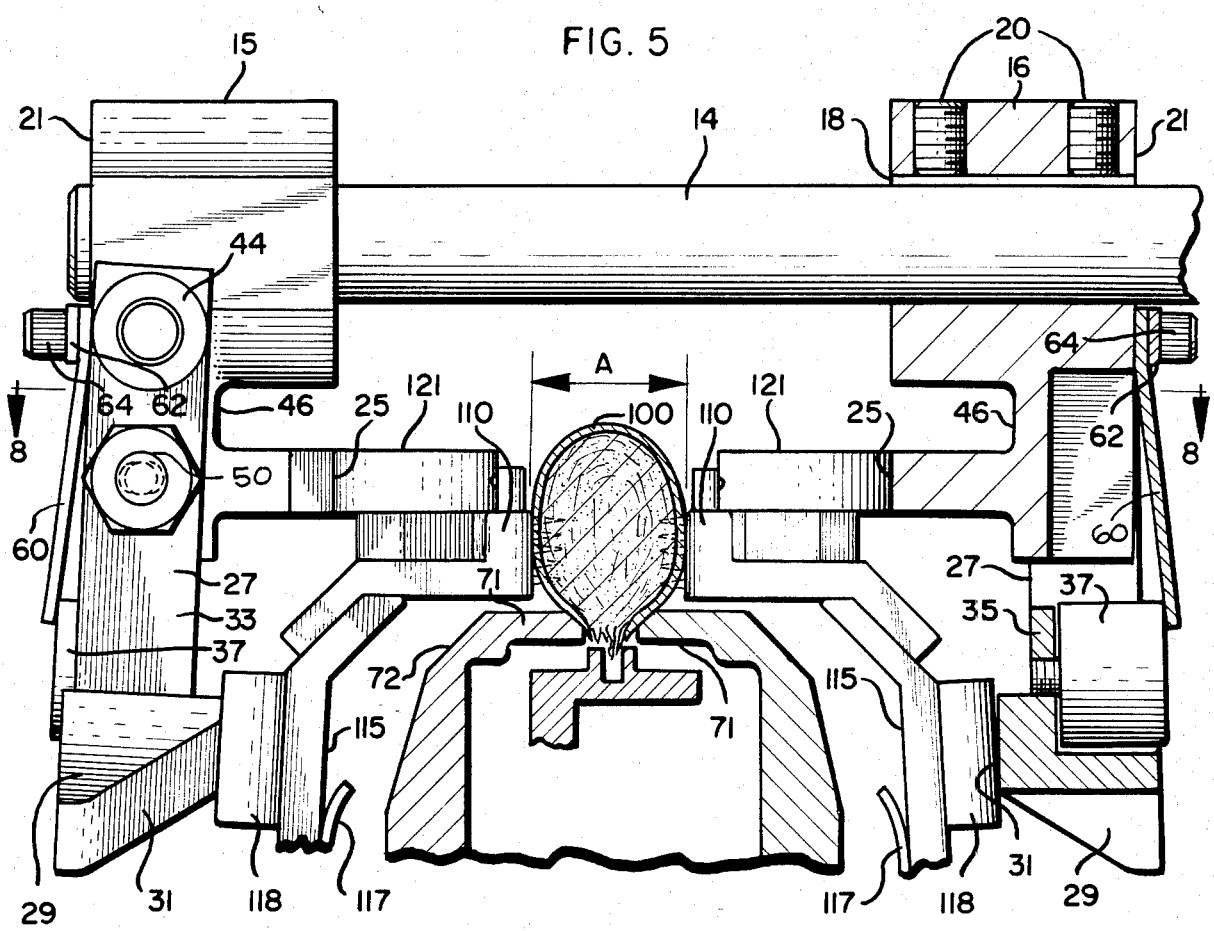
FIG. 5 is a fragmentary, transverse section view similar to the section view of FIG. 4 except that the larger shrimp illustrated in FIG. 3 is disposed in the shrimp holder.
Figure 6:
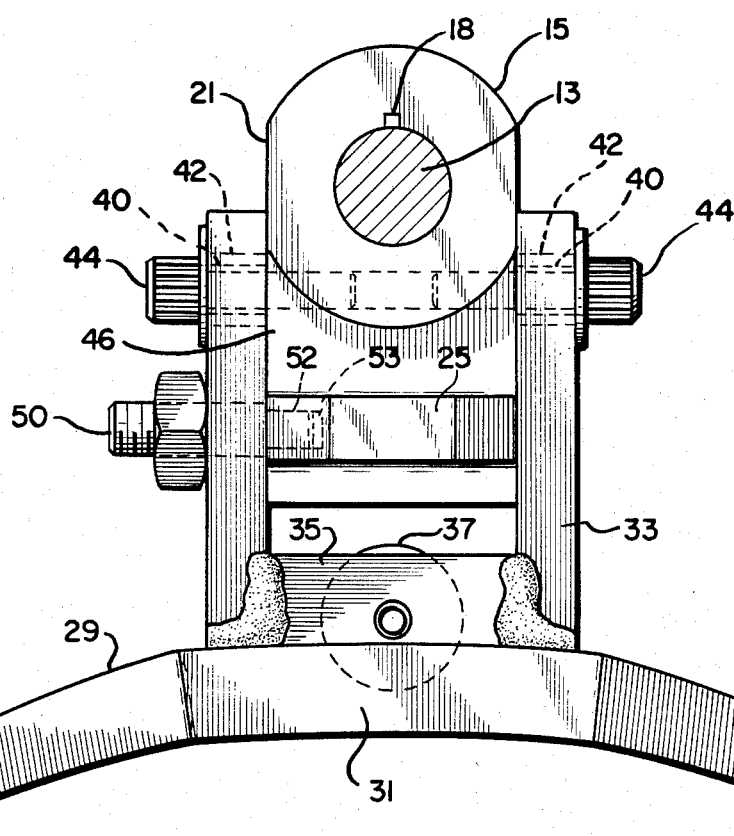
FIG. 6 is a fragmentary section view taken along line 6—6 in FIG. 4 showing the upper and lower tail breaker cams.

Lower tail breaker cam member 27 comprises cam 29 having cam surface 31 and a yoke 33 extending upward from the lower cam. Wear block mounting bar 35, FIGS. 4, 5, 6, is disposed at the lower end of the yoke adjacent the lower cam. Wear block 37, which can be made of nylon or other suitable material, is fastened to the mounting bar by any suitable means as, for example, screws 39 shown in FIG. 1.

Lower tail breaker cam member 27 is pivotally mounted to upper tail breaker cam member 21. Spacer 40, FIG. 6, is disposed in a bearing 42 located in each of the legs forming the yoke 33. Screw 44 extends through spacer 40 and is threaded into the extension 46 of the upper cam member whereby the lower cam member 27 is adapted to pivot with respect to upper cam member 21 about the location of pivot screws 44.

A stroke limit screw 50 is threaded into one leg of each yoke 33 with the end of each screw having a reduced, cylindrical or shouldered section 52. This cylindrical or shouldered section 52 extends into a bore 53. Bore 53 is somewhat larger in diameter than the cylindrical section 52. The difference between these two diameters will determine the limit to which the lower cam member 27 pivots with respect to upper cam member 21.

One end of biasing spring 60 is connected to upper cam member 21 by means of a spring retainer bar 62 and screws 64 as seen in FIG. 1. The remaining end of biasing springs 60 seats against wear block 37, the biasing springs serving to urge lower cam members 27 inwardly.

Referring to FIGS. 1 and 4, disposed below shaft 14 and between the tail breaker cam assemblies 15, 16 is a shrimp holder unit 70 which is mounted on a rotary member moving in the direction of the arrow shown in FIG. 1, which carries shrimp being processed through the tail breaker station. Shrimp holder unit 70 is a conventional unit, the operation of which is described, for example, in U.S. Pat. No. 3,247,542. Shrimp 100, which is to be peeled and cleaned, is gripped between arcuate shell clamping elements 71 formed by the outer ends of a pair of opposed gripping jaws 72 swingably mounted on a central shaft 73 carried by the holder frame, not shown. Springs, not shown, act to urge the shell clamping elements 71 toward each other and opposed cams, not shown, cooperate with cam followers to control movement of the clamping elements 71 toward and away from each other.

At the shrimp tail breaking station, the shell of each shrimp, which is clamped securely in holder 70, is stretched beyond its breaking point by the action on the shrimp shell of two pairs of shell clutches 110, 112 carried by the holder 70. Each shell clutch 110 comprises four needle-sharp tines 113 and each clutch 112 comprises five needle-sharp tines 114, the tines 113, 114 being adapted to slightly pierce and anchor the adjacent portions of a shrimp shell against slippage in relation to the respective clutches without applying damaging pressure to the shrimp shell.

The two pairs of shell clutches 110, 112 on each holder 70 are carried by a pair of shell rupturing jaws 115 swingably mounted on two lower pivots 116 carried by the holder frame. One clutch of each pair of clutches 110, 112 is supported on the upper end of each jaw 115.

Leaf springs 117 urge the jaws 115 away from each other to normal positions in which the clutches 110, 112 are spaced from a shrimp 100 gripped in holder 70.

Figure 7:
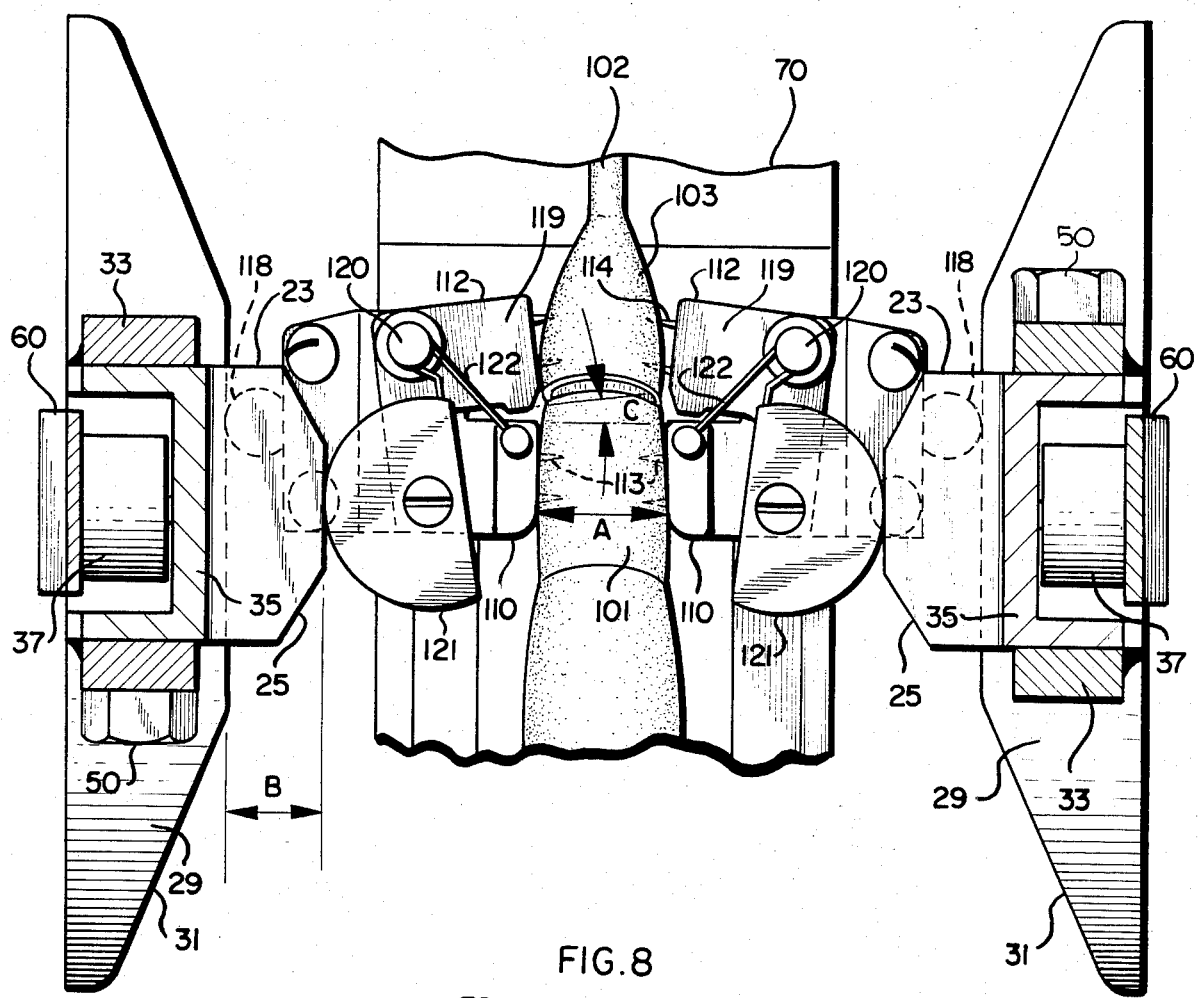
FIG. 7 shows a fragmentary plan section view of the tail breaker assembly of FIG. 4 with the small shrimp of FIG. 2 disposed in the shrimp holder, taken along line 7—7 in FIG. 4; and, FIG. 8 shows a fragmentary plan view of the tail breaker assembly of FIG. 5 with the larger shrimp illustrated in FIG. 3 disposed in the shrimp holder, taken along line 8—8 in FIG. 5.

As each holder 70 moves into the tail breaking station, cams 29 engage cam followers 118 attached to jaws 115, FIG. 4, whereby jaws 115 swing toward each other to engage clutches 110, 112 with adjacent portions of the shrimp shell intervening between the clutches, as shown, for example, in FIG. 7.

Figure 8:
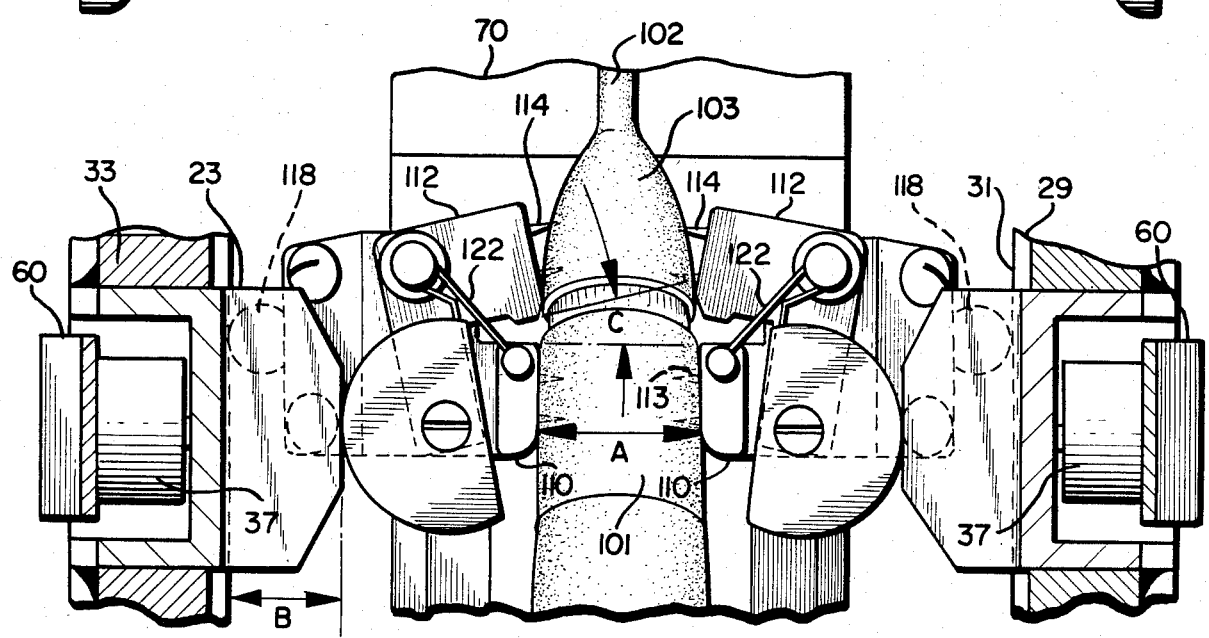

The five tines of each clutch 112 are set in a portion of a supporting bell crank or lever 119 supported by a pivot 120, FIGS. 7 and 8, to confront the adjacent shrimp shell upon swinging of the jaws 115 toward each other.

As shown in FIGS. 7 and 8, the pair of clutches 112 are positioned to engage the shell of an intervening shrimp 100 between the pair of clutches 110 and the tail 102 of the shrimp. Tines 114 of each clutch 112 are arranged to slightly penetrate the segment of the shrimp shell 103 which is immediately adjacent the tail 102 of the shrimp.

As movement of the holder 70 continues in a shrimp processing operation, upper cam member 23 having cam surface 25 engages cam follower 121 attached to the bell crank or lever 119, FIGS. 7, 8, to swing lever 119 about the pivot 120 in a direction which moves clutch 112 away from clutch 110 toward the adjacent shrimp tail 102, as shown in FIG. 7, as measured by angle C.

Movement of the pair of clutches 112 away from the pair of clutches 110 pulls tail adjoining segment 103 of the shrimp shell a certain distance or stroke away from the adjacent segment 101 of the shrimp shell, which is effectively anchored by the clutches 110. This action tensions and overstretches the shell between the clutches 110 and 112 to effect rupturing of the shell between the clutches 112 and 110. The flesh body of the shrimp is more elastic than the shrimp shell and is not significantly weakened by the stretching action which ruptures the shell.

Continued movement of the holder 70 in the direction of the arrow shown in FIG. 1 carries the holder beyond cams 23, 29 whereupon clutches 110, 112 are disengaged from the shrimp by the springs 117 causing jaws 115 to return to their normal position. The bell cranks 119 are returned to their normal positions by springs 112.

Because the lower cam members 29 are pivotable relative to cam members 23, shrimp of different sizes can be accommodated in holder 70 without the need for adjusting the location of tail breaker cam assemblies 15, 16. Utilizing the present invention, the assemblies 15, 16 initially are set to accommodate a small shrimp such as shown in FIGS. 2 and 5, having a body width A. In the course of a tail breaking operation described above, clutches 112 pivot relative to clutches 110 a certain amount as measured by angle C shown in FIG. 7.

When peeling larger shrimp, such as of the size shown in FIGS. 3 and 8, having a larger dimension A than the shrimp located in holder 70 in FIG. 7, the location of tail breaker cam assemblies 15, 16 need not be adjusted manually relative to each other in the tail breaking operation. The present invention automatically provides the necessary adjustment because the larger shrimp will cause the lower tail breaker cam members 27 to be forced outwardly against biasing springs 60 which normally serve to force the lower cam members toward the shrimp in holder 70. Biasing spring 60 applies sufficient force to the lower tail breaker cam members 27 to permit the shrimp to be firmly grasped, yet the springs allow members 27 to pivot outwardly to accommodate the larger shrimp without crushing or damaging the different size shrimp.

Further, since pivoting of the lower cam member 27 relative to upper cam member 21 changes the relationship between the lower and upper cam members as illustrated by the dimension B in FIGS. 7 and 8, the amount of stroke as reflected by angle C, FIGS. 7 and 8, permitted by bell cranks 119, likewise changes. Accordingly, larger shrimp in holder 70 increase the dimension A, whereupon the dimension B will be increased about one-half of the increase in the amount of dimension A and angle C will increase also. For small size shrimp, lower tail breaker cam members 27 do not pivot and the stroke as measured by angle C, is short as illustrated in FIG. 7.

Utilization of the tail breaker cam assembly of the present invention serves to obviate the need for manually adjusting the location of tail breaker cam assemblies as has been required with conventional shrimp processing machines; and, further, provision has been made for increasing the amount of stroke as the size of the shrimp increases.

It will be understood that the invention can be embodied in modified forms, and is not limited to the exact details as shown.

What is claimed:

1. A shrimp processing apparatus having a tail breaking station where the main portion of a shrimp shell is fractured from the shrimp tail without removing the tail, said apparatus comprising:
   holder means for gripping and ultimately moving shrimp to be processed through and tail breaking station;
   said holder means including at least a first and second clutch means each having tines adapted to enter a shrimp shell disposed in said holder means;
   said first clutch means being adapted to pivot relative to said second clutch means to effect a stroke between said first and second clutch means;
   a first cam follower adapted to act against a first cam means to cause said first and second clutch means to pivot relative to each other;
   a second cam follower adapted to act against a second cam means to cause said first and second clutch means to move toward or away from a shrimp being processed;
   a first fixed cam means adapted to contact said first cam follower; and,
   a second cam means pivotable about said first cam member and adapted to contact with second cam follower whereby different size shrimp can be accommodated in said apparatus and said second cam means can pivot outwardly away from said holder means as the size of said shrimp increases.

2. A shrimp processing machine in accordance with claim 1 and further including biasing means for biasing said pivotable second cam means toward said clutch means.

3. A shrimp processing machine in accordance with claim 2 and further including means for limiting the distance said second cam means can pivot about said first cam means.

4. A shrimp processing machine in accordance with claim 1 wherein said first cam means includes an extension and said second cam means includes a pair of spaced legs, disposed about said extension, the outer ends of said legs being pivotally connected to said first cam member.

5. A shrimp processing machine in accordance with claim 2 wherein said biasing means includes a leaf spring having two ends; one of said ends being attached to said first cam means and the remaining spring end contacting said pivotable second cam means to urge said second cam means toward said holder means.

6. A shrimp machine for processing shrimp, said machine having a station where the shrimp tail section is fractured from the main shell, said machine including:
   holder means for holding the shrimp, said holder means further including spaced first and second pairs of clutch means having tines adapted to enter said shrimp shell,
   said first pair of clutch means being pivotable relative to said second pair of clutch means;
   a pair of spaced tail breaker cam assemblies, each tail breaker cam assembly being disposed on one side of said holder means and adjacent one pair of said first and second clutch means; each of said tail breaker cam assemblies comprising:
   an upper fixed cam member;
   a lower cam member pivotable about said upper cam member;
   said upper cam member being adapted to contact a first cam follower to cause said first and second clutch means to pivot relative to each other; and, said lower cam member being adapted to contact a second cam follower to cause said first and second clutch means to move toward or away from said holder means and said second cam member being pivotable away from said holder means as shrimp of increased size are disposed in said holder means.

7. A shrimp machine in accordance with claim 6 and further including biasing means for urging said pivotable lower cam member toward said holder means.

8. A shrimp machine in accordance with claim 7 wherein each of said tail breaker cam assemblies further include means for limiting the distance said lower cam member pivots about said upper cam member.

9. A shrimp machine in accordance with claim 8 wherein said first cam member includes an extension and said second cam member includes a pair of spaced legs, said extension being disposed in the space between said legs, the outer ends of said legs being pivotably connected to said extension.

10. A shrimp machine in accordance with claim 9 wherein said biasing means comprises a leaf spring having two ends, one of said ends being connected to said upper cam member, and said remaining end being biased against said lower cam member to urge said lower member toward said holder means.

11. A tail breaker cam assembly for use with a shrimp processing machine said tail breaker cam assembly comprising a first cam member;

a second cam member pivotable about said first cam member;

biasing means for urging said pivotal cam member in one direction; and, means for limiting the amount of travel of said pivotable cam member about said first cam member.

12. A tail breaker cam assembly in accordance with claim 11 wherein said first cam member is fixed and includes an extension;

said second cam member includes a pair of spaced legs connected to said second cam member with a leg being disposed on each side of said extension and having one end of said legs being pivotally connected to said extension; and, biasing means for biasing said second cam member in one direction.

13. A tail breaker cam assembly in accordance with claim 12 wherein said assembly further includes means for limiting the travel of said second cam member about said first cam member.

14. A tail breaker cam assembly in accordance with claim 13 wherein said biasing means comprises a leaf spring having two ends; one of said spring ends being connected to said first cam member and said remaining spring end being biased against said second cam member.

15. A tail breaker cam assembly in accordance with claim 14 wherein said means for limiting the travel of said second cam member further includes a screw means having a shouldered end, a threaded hole in one of said legs of said second member in which said screw means is disposed; and, said extension having a bore into which said shouldered screw means enters whereby the amount of travel of said second member will be determined by the amount of clearance between said shouldered screw means and said bore.

16. A tail breaker cam assembly in accordance with claim 15 wherein said second cam member has a cam surface adapted to be contacted by a second cam follower means which serves to cause two pairs of clutches to close toward each other; and said first cam member has a cam surface which causes a first and second clutch means to pivot relative to each other to effect a stroke whereby the tail of a shrimp can be fractured and separated from the main portion of a shrimp shell.

* * * * *

UNITED STATES PATENT AND TRADEMARK OFFICE
CERTIFICATE OF CORRECTION

PATENT NO. : 4,507,825
DATED : April 2, 1985
INVENTOR(S) : E. Douglas Betts, Et Al.

It is certified that error appears in the above-identified patent and that said Letters Patent is hereby corrected as shown below:

Col. 5, line 18, delete "112", insert --122--;

Col. 6, line 6, delete "and", insert --said--.

Signed and Sealed this

Sixteenth Day of July 1985

[SEAL]

Attest:

DONALD J. QUIGG

Attesting Officer　　　Acting Commissioner of Patents and Trademarks